United States Patent
Niizuma

(10) Patent No.: US 9,481,258 B2
(45) Date of Patent: Nov. 1, 2016

(54) VEHICLE AND WIRELESS POWER SUPPLY SYSTEM

(75) Inventor: Motonao Niizuma, Tokyo (JP)

(73) Assignee: IHI CORPORATION (JP)

( * ) Notice: Subject to any disclaimer, the term of this patent is extended or adjusted under 35 U.S.C. 154(b) by 17 days.

(21) Appl. No.: 14/116,879

(22) PCT Filed: May 10, 2012

(86) PCT No.: PCT/JP2012/062020
§ 371 (c)(1),
(2), (4) Date: Nov. 11, 2013

(87) PCT Pub. No.: WO2012/153807
PCT Pub. Date: Nov. 15, 2012

(65) Prior Publication Data
US 2014/0062384 A1    Mar. 6, 2014

(30) Foreign Application Priority Data

May 12, 2011  (JP) .................. 2011-107570
May 12, 2011  (JP) .................. 2011-107571

(51) Int. Cl.
*H02J 7/00* (2006.01)
*B60L 1/00* (2006.01)
(Continued)

(52) U.S. Cl.
CPC ............. *B60L 11/182* (2013.01); *B60L 5/005* (2013.01); *B60L 11/1824* (2013.01);
(Continued)

(58) Field of Classification Search
CPC .......... H02J 7/00; H02J 7/025; H02J 7/0027; H02J 9/00; H02J 5/05; B60L 1/00; B60L 3/00; B60L 9/00; B60L 11/182; B60L 11/1824; B60L 11/1833; B60L 5/005; B60L 2260/32; Y02T 10/7005; Y02T 90/12; Y02T 90/121; Y02T 90/122; Y02T 90/125; Y02T 90/14; B60M 7/00

USPC ............. 320/104, 108, 109; 307/10.1; 191/2
See application file for complete search history.

(56) References Cited

U.S. PATENT DOCUMENTS 5,594,318 A   1/1997  Nor .................................. 320/2
6,087,806 A   7/2000  Fujioka ........................ 320/109
(Continued)

FOREIGN PATENT DOCUMENTS

CN   1281436 C     10/2006
CN   101764435 A   6/2010
(Continued)

OTHER PUBLICATIONS

Osamu et al., Machine Translation of Japanese Patent Document No. 2009-284695, published Dec. 3, 2009, machined translated by JPO on Jun. 27, 2015, 19 pages.*

(Continued)

*Primary Examiner* — Phallaka Kik
(74) *Attorney, Agent, or Firm* — Ostrolenk Faber LLP

(57) ABSTRACT

A vehicle (3, 3A) is provided with: a power receiving coil (3a) that is provided so as to face a ground power supply coil (2a) and that receives electric power from the ground power supply coil (2a); a storage battery (3d) that stores the electric power received by the power receiving coil (3a); and a power supply coil (3f) that supplies the electric power received by the power receiving coil (3a) to the outside. A transporting system is provided with: a plurality of travel tracks (1A, 1B) along which the plurality of vehicles (3, 3A) travel; and power transfer areas (Ka, Kb) where a vehicle (3, 3A) traveling along a travel track (1A) and a vehicle (3, 3A) traveling along another travel track (1B) are able to mutually transfer electric power to each other.

10 Claims, 9 Drawing Sheets

(51) Int. Cl.
  *B60L 3/00* (2006.01)
  *B60L 9/00* (2006.01)
  *B60L 11/18* (2006.01)
  *H02J 7/02* (2016.01)
  *B60L 5/00* (2006.01)
  *B60M 7/00* (2006.01)
  *H02J 5/00* (2016.01)

(52) U.S. Cl.
  CPC ............ *B60L 11/1833* (2013.01); *B60M 7/00* (2013.01); *H02J 5/005* (2013.01); *H02J 7/0027* (2013.01); *H02J 7/025* (2013.01); *B60L 2260/32* (2013.01); *Y02T 10/7005* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 7,443,049 | B1 | 10/2008 | Jones ............................ 307/9.1 |
| 8,487,480 | B1* | 7/2013 | Kesler et al. ................. 307/104 |
| 9,126,490 | B2* | 9/2015 | Cook ..................... B60L 11/182 |
| 9,369,182 | B2* | 6/2016 | Kurs ....................... H01Q 1/248 |
| 2003/0234730 | A1 | 12/2003 | Arms et al. |
| 2004/0119340 | A1 | 6/2004 | Nishino .......................... 307/31 |
| 2009/0115373 | A1* | 5/2009 | Kokotovich et al. ......... 320/137 |
| 2010/0164296 | A1* | 7/2010 | Kurs et al. ................... 307/104 |
| 2010/0231340 | A1* | 9/2010 | Fiorello et al. ................ 336/92 |
| 2010/0259108 | A1* | 10/2010 | Giler et al. .................... 307/104 |
| 2011/0095618 | A1* | 4/2011 | Schatz et al. ................. 307/104 |
| 2012/0091819 | A1* | 4/2012 | Kulikowski et al. ......... 307/104 |
| 2012/0091950 | A1* | 4/2012 | Campanella et al. ........ 320/108 |
| 2012/0112531 | A1* | 5/2012 | Kesler et al. ................. 307/9.1 |
| 2012/0153732 | A1* | 6/2012 | Kurs et al. .................... 307/104 |
| 2012/0242159 | A1* | 9/2012 | Lou et al. ...................... 307/104 |
| 2012/0242225 | A1* | 9/2012 | Karalis et al. ................. 315/70 |
| 2012/0256494 | A1* | 10/2012 | Kesler et al. ................. 307/104 |
| 2012/0313742 | A1* | 12/2012 | Kurs et al. .................... 336/180 |
| 2013/0038272 | A1* | 2/2013 | Sagata .......................... 320/106 |
| 2013/0334892 | A1* | 12/2013 | Hall et al. ..................... 307/104 |
| 2014/0159652 | A1* | 6/2014 | Hall et al. ..................... 320/108 |
| 2014/0175898 | A1* | 6/2014 | Kurs et al. .................... 307/104 |
| 2015/0255994 | A1* | 9/2015 | Kesler .................... H02J 5/005 307/10.1 |
| 2015/0270719 | A1* | 9/2015 | Kurs ....................... H02J 5/005 320/108 |
| 2016/0197489 | A1* | 7/2016 | Kurs ....................... H02J 5/005 320/108 |

FOREIGN PATENT DOCUMENTS

| | | | |
|---|---|---|---|
| DE | 69602739 T2 | 10/1999 | |
| DE | 102009028565 A1 | 2/2011 | |
| FR | 2947113 A1 * | 12/2010 | ............... H02J 7/02 |
| JP | 03-289302 | 12/1991 | |
| JP | 08-101713 | 4/1996 | |
| JP | 11-285109 | 10/1999 | |
| JP | A-2001-177916 | 6/2001 | |
| JP | 2001211501 A * | 8/2001 | ............... H02J 7/00 |
| JP | 2005-210843 | 8/2005 | |
| JP | 2007159359 A * | 6/2007 | ............. B60L 11/18 |
| JP | 2008-312401 | 12/2008 | |
| JP | 2009-225551 | 10/2009 | |
| JP | 2009-284695 | 12/2009 | |
| JP | 2010-035333 | 2/2010 | |
| JP | 2010-064859 | 3/2010 | |
| JP | 2010-088190 | 4/2010 | |
| JP | 2010-193657 | 9/2010 | |
| JP | 2010-239714 | 10/2010 | |
| JP | A-2010-246271 | 10/2010 | |
| JP | A-2012-239334 | 12/2012 | |
| WO | WO 2009/029785 A1 | 3/2009 | |
| WO | WO 2010006078 A1 * | 1/2010 | ............... H02J 7/00 |
| WO | WO 2010/041312 A1 | 4/2010 | |

OTHER PUBLICATIONS

Takeshi et al. (English Machine translations of Japanese Document No. JP-11-285109, published Oct. 15, 1999, machine translated by JPO on Mar. 19, 2016).*
International Search Report mailed Aug. 14, 2012 in corresponding PCT International Application No. PCT/JP2012/062020.
Chinese Office Action, dated Jun. 3, 2015, issued in corresponding Chinese Patent Application No. 201280022891.X. English Translation. Total pp. 11.
Written Opinion mailed Aug. 14, 2012 in corresponding PCT International Application No. PCT/JP2012/062020 with an English language translation.
Notice of Allowance dated Sep. 24, 2015 in corresponding Japanese Patent Application No. 2014-238921 (with English language translation)(6 pages).
Chinese Office Action, dated Jan. 20, 2016, issued in corresponding Chinese Patent Application No. 201280022891.X. English translation. Total 14 pages.

* cited by examiner

VEHICLE AND WIRELESS POWER SUPPLY SYSTEM

CROSS-REFERENCE TO RELATED APPLICATIONS

The present application is a 35 U.S.C. §§371 national phase conversion of PCT/JP2012/062020, filed May 10, 2012, which claims priority to Japanese Patent Application Nos. 2011-107570 and 2011-107571, filed May 12, 2011, the contents of which are incorporated herein by reference. The PCT International Application was published in the Japanese language.

TECHNICAL FIELD

The present invention relates to a vehicle and a wireless power supply system.

BACKGROUND ART

In the patent document 1 listed below, a power transmission system that transmits electric power without any contact being made by using an antenna coil is disclosed. In the patent document 2 listed below, a moving vehicle power supply system is disclosed in which a plurality of power transmitting devices are provided in a power supply area, and electric power is supplied from the respective power transmitting devices to a moving vehicle without any contact being made with that vehicle. In the patent document 3 listed below, traveling control technology for an unmanned traveling vehicle relating to a power transmission system and a moving vehicle power supply system is disclosed. In this technology, in the control of the operations of a battery-driven type of unmanned traveling vehicle that travels along a taxiway on which a plurality of stations are provided and that performs transportation tasks by stopping in sequence at stations specified by an external communication device, when an unmanned traveling vehicle arrives at reference stations that form a travel start position and a travel finish position, the battery voltage of the traveling unmanned vehicle is measured, and the unmanned traveling vehicle is made to move to a battery charging station when the battery voltage is equal to or less than a fixed reference value. As a result, the task of charging the unmanned traveling vehicle won't have any adverse effects on the transporting task.

RELATED ART DOCUMENTS

Patent Documents

[Patent document 1] Japanese Patent Application, First Publication No. 2009-225551
[Patent document 2] Japanese Patent Application, First Publication No. 2010-193657
[Patent document 3] Japanese Patent Application, First Publication No. H8-101713

DISCLOSURE OF THE INVENTION

Problems to be Solved by the Invention

In the moving vehicle power supply system described in patent document 2, it is necessary for a power transmitting device to be provided at each of the park positions of the moving vehicle. Because of this, the installation of the power transmitting devices as well as their maintenance requires both time and expenditure. For example, if wireless power supply equipment is to be temporarily installed on a construction site or at an event site, then if the number of power transmitting devices is large, their installation requires a considerable length of time. Accordingly, it is difficult for such a site to be set up with any rapidity.

In the traveling control technology for an unmanned traveling vehicle described in patent document 3, when, for example, a taxiway is set up over a wide area, then the aforementioned moving vehicles (i.e., the unmanned traveling vehicles) may include both unmanned traveling vehicles A that perform transporting tasks while traveling within an area that is comparatively near to a battery charging station, and unmanned traveling vehicles B that perform transporting tasks while traveling within an area that is comparatively far from a battery charging station. In this case, because the unmanned traveling vehicles B travel longer distances than the unmanned traveling vehicles A and move to a battery charging station irrespective of whether or not they are carrying a load, the task of charging an unmanned traveling vehicle has a considerable effect on the transporting tasks.

Moreover, it is also necessary to determine a sufficient battery capacity to meet the needs of the unmanned traveling vehicle that is performing a transporting task in the furthest location from the battery charging station. For this reason, the size of the battery of an unmanned traveling vehicle increases.

Aspects of the present invention were conceived in view of the above-described circumstances, and it is an object thereof to supply electric power to a transporting vehicle using fewer wireless power supply devices than is the case conventionally for a plurality of objects to be charged, and to reduce the effects inflicted on a transporting task by the task of charging the transporting vehicle (i.e., an unmanned traveling vehicle) compared to the conventional system, while at the same time suppressing any tendency for the size of the battery (i.e., storage battery) to increase.

Means for Solving the Problem

In order to achieve the above-described objects, in the first aspect of the present invention, as the first means of solving the problems a structure is employed in which a vehicle is provided with a power receiving device that is provided so as to face a ground power supply device and that receives electric power from the ground power supply device, a power storage device that stores the electric power received by the power receiving device, and a power supply device that supplies at least a portion of the electric power received by the power receiving device to an external object that is to be supplied with the electric power.

As the second means of solving the problems a structure is employed in which, in the above-described first means of solving the problems, the power receiving device is provided on one side surface of the vehicle, while the power supply device is provided on the other side surface of the vehicle.

As the third means of solving the problems a structure is employed in which, in the above-described first or second means of solving the problems, there are further provided: a wireless communication device that performs wireless communication with the outside; and a control device that ascertains the charge state of the object to be supplied with electric power by the power supply device using the wireless communication device, and adjusts the amount of electric power that is supplied to the object to be supplied with electric power from the power supply device in accordance with the charge state.

As the fourth means of solving the problems a structure is employed in which, in the above-described third means of solving the problems, when the amount of electric power that is stored in the object to be supplied with electric power is greater than the amount of electric power that is stored in the storage device, the control device limits the amount of charging that is provided to the storage device and gives priority to charging the object to be supplied with electric power to a fully charged state.

As the fifth means of solving the problems a structure is employed in which a wireless power supply system that supplies electric power from a ground power supply device to a vehicle without making contact with that vehicle is provided with: the vehicle according to any one of the above-described first through fourth means of solving the problems; and a plurality of parking areas that are mutually adjacent to each other where the vehicle parks.

As the sixth means of solving the problems a structure is employed in which, in the above-described fifth means of solving the problems, the parking areas are provided on travel tracks along which moving objects in the form of unmanned transporting vehicles travel.

As the seventh means of solving the problems a structure is employed in which a transporting system is provided with: a plurality of the vehicles according to any one of the above-described first through fourth means of solving the problems that are driven by storage batteries and that receive electric power from outside and supply power to outside; a plurality of travel tracks along which the vehicles travel; and power transfer areas that are areas where a particular travel track is adjacent to another travel track, and where a vehicle traveling along a particular travel track and a vehicle traveling along another travel track are able to mutually transfer electric power to each other.

As the eighth means of solving the problems a structure is employed in which, in the above-described seventh means of solving the problems, the vehicles mutually transfer electric power while traveling in a power transfer area.

As the ninth means of solving the problems a structure is employed in which, in the above-described seventh or eighth means of solving the problems, power receiving coils that receive electric power without making contact and power supply coils that receive electric power without making contact are provided in a plurality of positions in the vehicles.

Effects of the Invention

According to aspects of the present invention, a vehicle is provided with a power receiving device that is provided so as to face a ground power supply device and that receives electric power from the ground power supply device, and with a power supply device that supplies at least a portion of the electric power received by the power receiving device to an external object that is to be supplied with power. Because of this, the vehicle is able to supply electric power to another vehicle that has parked adjacently to that vehicle. As a result, it is possible to decrease the number of ground power supply devices compared to a conventional system. Accordingly, the time and expenditure required for the installation of the ground power supply devices as well as for their maintenance can both be reduced compared to a conventional system.

Furthermore, in a power transfer area, a first vehicle that is traveling along a particular travel track and a second vehicle that is traveling along another travel track both supply and receive electric power. Because of this, a vehicle is able to receive electric power without traveling past a charging station. Accordingly, it is possible to reduce the effects inflicted on a transporting task by the task of charging a vehicle compared to the conventional system. Furthermore, it is also possible to suppress any tendency for the size of the battery to increase.

EMBODIMENTS FOR CARRYING OUT THE INVENTION (First Embodiment)

Hereinafter, a first embodiment of the present invention will be described with reference made to the drawings.

Figure 1:
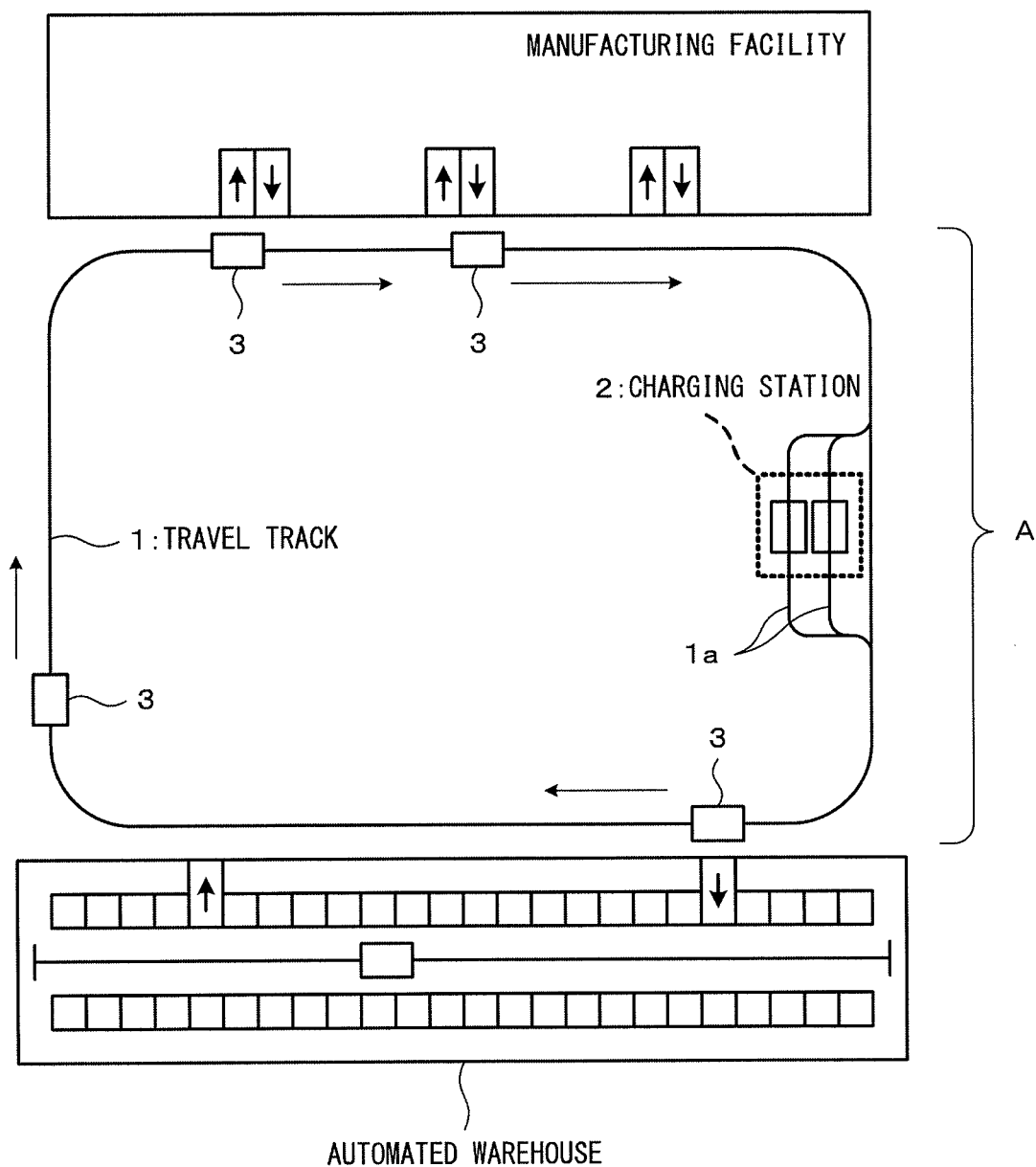
FIG. 1 is a block diagram showing the functional structure of an unmanned transporting system that includes a wireless power supply system according to the first embodiment of the present invention.

A wireless power supply system of the present embodiment is applied to an unmanned transporting system A such as that shown in FIG. 1. As is shown in FIG. 1, the unmanned transporting system A performs transporting tasks to transport articles such as components and finished products between an automated warehouse and a manufacturing facility, and is composed of a travel track 1, a charging station 2, and a plurality of unmanned transporting vehicles 3 (i.e., vehicles).

Storage stations and retrieval stations that are used for transferring articles with the unmanned transporting vehicles 3 (these are represented by the rectangles containing either upward or downward pointing arrows in FIG. 1) are provided in the aforementioned automated warehouse and manufacturing facility. As is shown in the drawing, the travel track 1 is provided in a loop shape (i.e., an endless loop) that extends between the storage stations and retrieval stations of the automated warehouse and the storage stations and retrieval stations of the manufacturing facility, and guides the traveling of the unmanned transporting vehicles 3. Note that various types of track are known as tracks for the travel track 1 depending on the travel system used by the unmanned transporting vehicles 3.

The charging station 2 is provided on branch tracks 1*a* that branch off from a portion of the travel track 1, and is an area where the unmanned transporting vehicles 3 are able to park in order to recharge. The charging station 2 is described below in detail using FIG. 3.

The plurality of unmanned transporting vehicles 3 are unmanned traveling vehicles that performs the task of transporting articles between the aforementioned automated warehouse and manufacturing facility. Each unmanned transporting vehicle 3 travels in a clockwise direction shown by the arrows on the travel track 1 based on command information relating to a transporting task that it has received via wireless communication from a ground control station (not shown). By doing this, each unmanned transporting vehicle 3 transports articles such as components and the like from the retrieval station of the automated warehouse to a storage station of the manufacturing facility, and transports articles such as finished products from a retrieval station of the manufacturing facility to the storage station of the automated warehouse.

Figure 2:
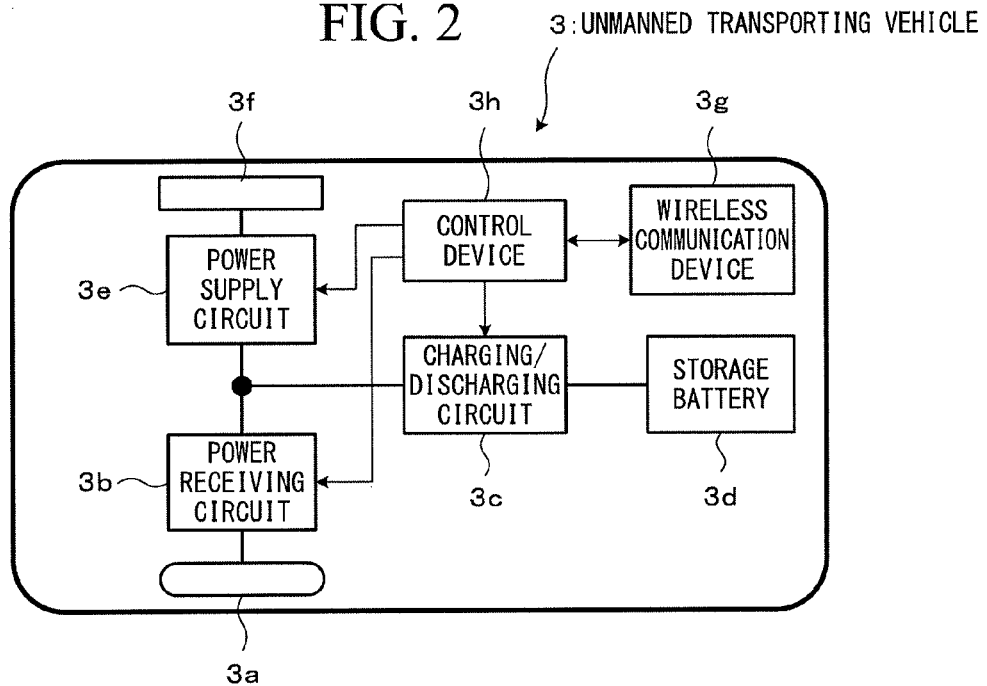
FIG. 2 is a block diagram showing the functional structure of a power transfer system of an unmanned transporting vehicle (i.e., a vehicle) in the first embodiment of the present invention.

The respective unmanned transporting vehicles 3 form a wireless power supply system together with the above-described charging station 2. FIG. 2 shows the functional structure of principal portions, namely, of the power transfer system of each unmanned transporting vehicle 3. Namely, each unmanned transporting vehicle 3 is provided with a power receiving coil 3*a*, a power receiving circuit 3*b*, a charging/discharging circuit 3*c*, a storage battery 3*d*, a power supply circuit 3*e*, a power supply coil 3*f*, a wireless communication device 3*g*, and a control device 3*h* as functional component elements of the power receiving and supply system.

Figure 3:
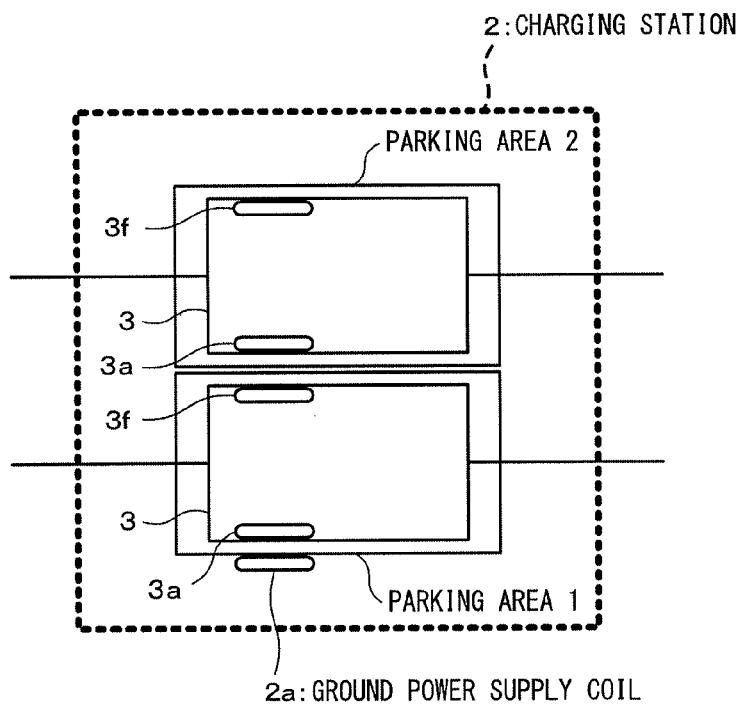
FIG. 3 is an outline view showing the structure of a charging station in the first embodiment of the present invention.

The power receiving coil 3*a* is an induction coil that receives wirelessly supplied power from a ground power supply coil 2*a* shown in FIG. 3, and is provided at a height (i.e., a position) where it directly faces the ground power supply coil 2*a* at one side surface of the unmanned transporting vehicle 3. The power receiving coil 3*a* receives AC electric power by means of electromagnetic induction that is based on an alternating magnetic field that is generated by the ground power supply coil 2*a* without making any contact with this ground power supply coil 2*a*, and then outputs it to the power receiving circuit 3*b*. The power receiving circuit 3*b* is a power conversion circuit that converts the AC electric power input from the power receiving coil 3*a* into DC electric power, and outputs this DC electric power to the charging/discharging circuit 3*c* and the power supply circuit 3*e*.

The charging/discharging circuit 3*c* is a power regulating circuit that regulates the supply of electric power from the power receiving circuit 3*b* to the storage battery 3*d* (i.e., the charging), and the supply of electric power from the storage battery 3*d* to the power supply circuit 3*e* (i.e., the discharging). The charging/discharging circuit 3*c*, for example, outputs the DC electric power supplied from the power receiving circuit 3*b* to the storage battery 3*d* as charging electric power while adjusting the current thereof such that this remains at a constant level. The charging/discharging circuit 3*c* also outputs the DC electric power (i.e., the discharge electric power) supplied from the storage battery 3*d* to the power supply circuit 3*e* while regulating the upper limit value thereof. The storage battery 3*d* is a secondary battery such as a lithium-ion battery or a lead storage battery. The storage battery 3*d* is charged with the DC electric power supplied from the charging/discharging circuit 3*c*, and discharges its accumulated electric power so as to supply it to the charging/discharging circuit 3*c*.

Note that, although omitted from FIG. 2, the unmanned transporting vehicles 3 are provided with: the functional component elements of a driving system such as a plurality of drive wheels, carrying wheels, and a travel motor that drives the drive wheels; a load handling system that performs the receiving and delivery of articles with the storage stations and retrieval stations; and with the functional components of a main control system that collectively controls the driving system and the load handling system. The driving system, the load handling system, and the main control system function using electric power from the storage battery 3*d* as a power source.

The power supply circuit 3*e* is a power conversion circuit that converts the discharge electric power supplied from the charging/discharging circuit 3*c* into AC electric power, and then outputs this AC electric power to the power supply coil 3*f*. The power supply coil 3*f* generates an induction magnetic field based on the AC electric power supplied from the power supply circuit 3*e*, and supplies this AC electric power to the outside via the induction magnetic field. As is shown in the drawings, the power supply coil 3*f* is provided on the other side surface of the unmanned transporting vehicle 3, which is on the opposite side from the power receiving coil 3*a*, and at the same height as the power receiving coil 3*a*.

The power receiving coil 3*a* is provided in a position on the unmanned transporting vehicle 3 that corresponds to the position of the ground power supply coil 2*a*. The power supply coil 3*f* is provided at a position on the opposite side from the power receiving coil 3*a*, however, this is due to the structure of the charging station 2. Namely, as is shown in FIG. 3, the charging station 2 is provided with two mutually adjacent parking areas, namely, with a parking area 1 and a parking area 2 such that two unmanned transporting vehicles 3 are able to park with their side surfaces facing each other. The ground power supply coil 2*a* is provided at the side of one parking area, namely, at the side of the parking area 1 so as to be adjacent to the parking area 1.

When an unmanned transporting vehicle 3 has parked at each of the parking area 1 and the parking area 2, the two unmanned transporting vehicles 3 are positioned such that a side surface of one faces a side surface of the other. Moreover, the unmanned transporting vehicle 3 in the parking area 1 is positioned such that the power receiving coil 3*a* thereof faces the ground power supply coil 2*a*. The unmanned transporting vehicle 3 in the parking area 2 is positioned such that the power supply coil 3*a* thereof faces the power supply coil 3*f* of the unmanned transporting vehicle 3 that is parked in the parking area 1.

As is described above, the wireless communication device 3*g* communicates by wireless with the ground control station, and exchanges information relating to transporting tasks and to electric power receiving and supply processing with the wireless communication devices 3*g* of other unmanned transporting vehicles 3. The control device 3*h* collectively controls the power receiving circuit 3*b*, the charging/discharging circuit 3*c*, the power supply circuit 3*e*, and the wireless communication device 3*g* based on predetermined control programs. As a result of this control being performed, it is possible for transporting tasks and the processing to exchange electric power with other unmanned transporting vehicles 3 to be performed.

Next, operations of the unmanned transporting system A having the above-described structure, and particularly electric power supply and receiving operations of the unmanned transporting vehicle 3 will be described in detail with reference made to FIG. 4 and FIG. 5.

In the unmanned transporting system A, a ground control station (not shown) collectively controls the transporting tasks of the unmanned transporting vehicle 3. Namely, based on command information relating to a transporting task that is received by the wireless communication device 3g, the unmanned transporting vehicle 3 travels in a clockwise direction around the travel track 1. By doing this, the unmanned transporting vehicle 3 transports articles that it has received from the retrieval station of the automated warehouse to a storage station of the manufacturing facility, and transports articles that it has received from a retrieval station of the manufacturing facility to the storage station of the automated warehouse.

As a result of receiving in sequence command information relating to transporting tasks, the unmanned transporting vehicle 3 repeats in sequence the above-described transporting tasks. When, as a result of performing the above-described transporting tasks, the quantity of stored electric power in the storage battery 3d drops below a predetermined threshold value, the unmanned transporting vehicle 3 notifies this fact to the ground control station via the wireless communication device 3g, and acquires permission to travel to the charging station 2. This travel permission includes specifying information that specifies the parking area that is the travel destination.

Because the ground control station collectively controls all of the unmanned transporting vehicles 3, it is able to ascertain the usage situation in the charging station 2. Accordingly, the ground control station transmits to the unmanned transporting vehicle 3 that is attempting to acquire permission to travel to the charging station 2 the specifying information whose contents specify which parking area out of the two parking areas in the charging station 2 is not currently in use (namely, which parking area does not have an unmanned transporting vehicle 3 currently using it). The unmanned transporting vehicle 3 then travels towards the parking area indicated in the information specifying the parking area. Note that the traveling and loading of the unmanned transporting vehicles 3 are controlled by the main control system that collectively controls the above-described driving system and load handling system.

Figure 4:
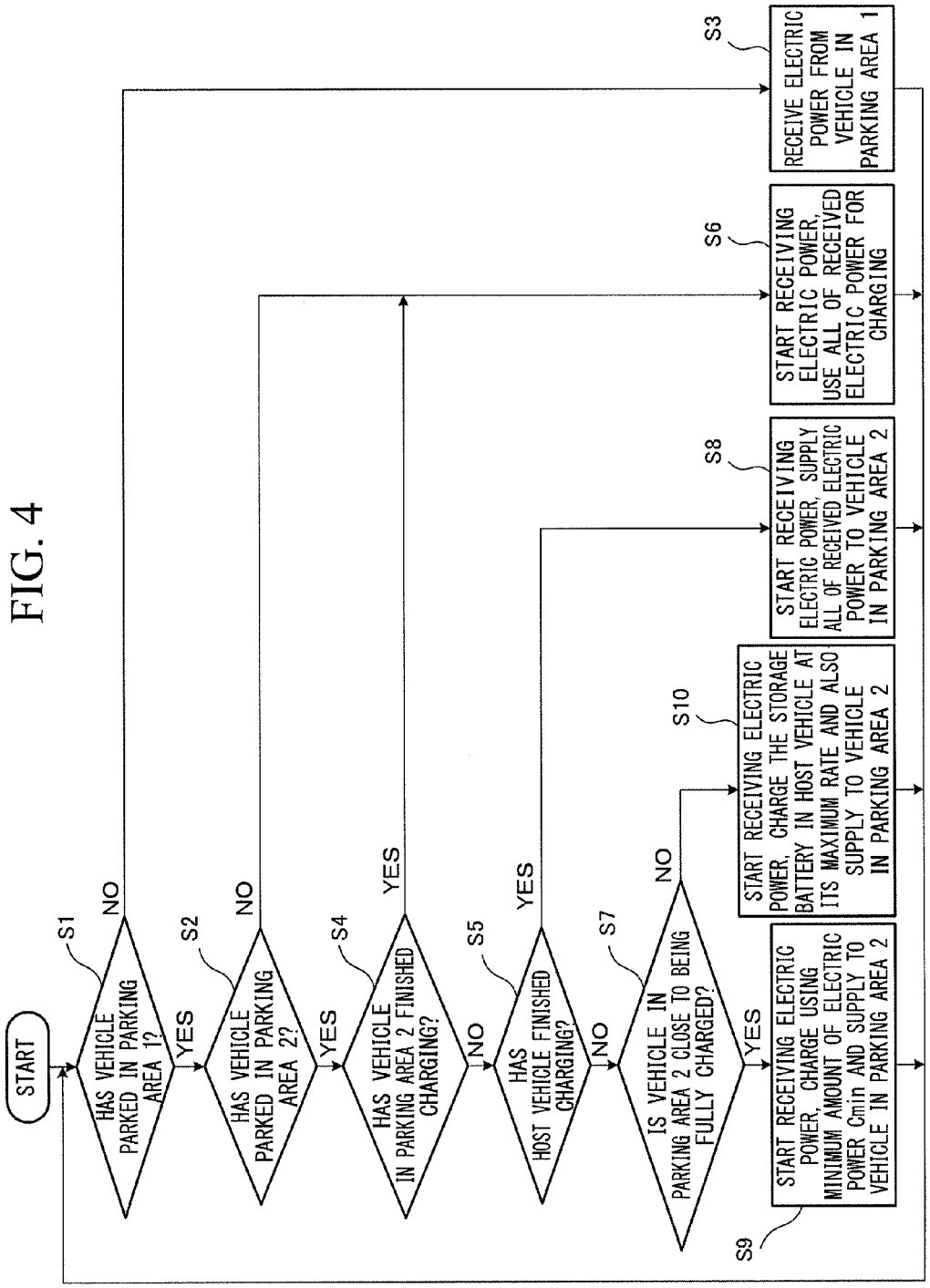
FIG. 4 is a flowchart showing a characteristic operation of a wireless power supply system according to the first embodiment of the present invention.

When the unmanned transporting vehicle 3 parks at the parking area specified by the ground control station, the control device 3h executes in the sequence shown in FIG. 4 control processing that relates to electric power transfer processing based on a control program.

Namely, based on information specifying the aforementioned parking area that was received, for example, by the wireless communication device 3g from the ground control station, the control device 3h determines whether or not the vehicle has parked in the parking area 1 that is adjacent to the ground power supply coil 2a (step S1). If the result of the determination in step S1 is [Yes] (namely, if a vehicle has parked in the parking area 1), the control device 3h confirms whether or not another unmanned transporting vehicle 3 has parked in the adjacent parking area 2 (step S2). Namely, the control device 3h performs the confirmation processing in step S2 by performing wireless communication with another unmanned transporting vehicle 3 or with the ground control station using the wireless communication device 3g.

If, on the other hand the result of the determination in step S1 is [No] (namely, if the unmanned transporting vehicle 3 (hereinafter, referred to as the host unmanned vehicle 3M) has parked in the parking area 2), the control device 3 receives electric power from the other unmanned transporting vehicle 3 that has already parked in the parking area 1 (step S3). Namely, by switching its power receiving circuit 3b from a standby state to a functioning state, the control device 3h receives AC electric power that is provided via the power receiving coil 3a and the power receiving circuit 3b from the power supply coil 3f of the unmanned transporting vehicle 3 that has parked in the parking area 1. By then switching its charging/discharging circuit 3c to charging mode, the control device 3h causes the storage battery 3d to be charged with the AC power charged via the power receiving coil 3a and the power receiving circuit 3b.

If, the result of the determination in step S2 is [Yes] (namely, if another unmanned transporting vehicle 3 has parked in the parking area 2), the control device 3h acquires information showing the charging situation by performing wireless communication using, for example, the wireless communication device 3g with the other unmanned transporting vehicle 3 (hereinafter, referred to as the other unmanned vehicle 3T) that has parked in the parking area 2. By doing this, the control device 3h confirms whether or not the other unmanned transporting vehicle 3T has completed charging (step S4). If the result of the determination in step S4 is [No] (namely, if the charging of the other unmanned transporting vehicle 3T has not been completed), the control device 3h confirms whether or not the charging of the storage battery 3d of the host unmanned transporting vehicle 3M has been completed (step S5). Namely, the control device 3h performs the confirmation processing of step S5 by acquiring information that shows the charging situation of the storage battery 3d from the charging/discharging circuit 3c.

If, on the other hand, the result of the determination in step S4 is [Yes] (namely, if the charging of the other unmanned transporting vehicle 3T has been completed), the control device 3h starts receiving electric power from the ground power supply coil 2a, and causes all of this received electric power to be used for charging the storage battery 3d (step S6). Namely, the control device 3h receives AC electric power that is supplied from the ground power supply coil 2a via the power receiving coil 3a and the power receiving circuit 3b by switching its power receiving circuit 3b from a standby state to a functioning state. Moreover, the control device 3h causes the storage battery 3d to be charged with the AC electric power received via the power receiving coil 3a and the power receiving circuit 3b by setting the charging/discharging circuit 3c to charging mode.

If, the result of the determination in step S5 is [No] (namely, if the storage battery 3d of the host unmanned transporting vehicle 3M is not yet fully charged), the control device 3h determines whether or not the other unmanned transporting vehicle 3T is close to being fully charged (step S7). Namely, the control device 3h compares information showing the charge state of the storage battery 3d of the other unmanned transporting vehicle 3T that it has already acquired from the other unmanned transporting vehicle 3T with information showing the charge state of the storage battery 3d of the host unmanned transporting vehicle 3M that it has already acquired from the charging/discharging circuit 3c. By doing this, the control device 3h determines whether or not the other unmanned transporting vehicle 3T will become fully charged sooner than the host unmanned transporting vehicle 3M.

If, on the other hand, the result of the determination in step S5 is [Yes] (namely, if the storage battery 3d of the host unmanned transporting vehicle 3M is fully charged), the control device 3h starts receiving electric power from the ground power supply coil 2a, and supplies all of this received electric power to the other unmanned transporting vehicle 3T (step S8).

Namely, the control device 3h receives AC electric power from the ground power supply coil 2a via the power receiving coil 3a and the power receiving circuit 3b by switching the power receiving circuit 3b from a standby state to a functioning state. In addition, the control device 3h sets the charging/discharging circuit 3c to a non-charging mode, and also switches the power supply circuit 3e from a standby state to a functioning state. By doing this, all of the AC electric power received from the ground power supply coil 2a is supplied to the power supply circuit 3e without any being used to charge the storage battery 3d. As a result of this, the AC electric power received from the ground power supply coil 2a is supplied to the power supply coil 3f via the power supply circuit 3e and is transmitted to the other unmanned transporting vehicle 3T.

If, the result of the determination in step S7 is [Yes] (namely, if the other unmanned transporting vehicle 3T is close to being fully charged), the control device 3h starts receiving electric power from the ground power supply coil 2a, and uses a comparatively small quantity of this received electric power, (i.e., minimal quantity of electric power Cmin) as charging electric power, and supplies the remaining, comparatively large quantity of electric power to the other unmanned transporting vehicle 3T (step S9).

Namely, the control device 3h receives AC electric power from the ground power supply coil 2a via the power receiving coil 3a and the power receiving circuit 3b by switching the power receiving circuit 3b from a standby state to a functioning state. The control device 3h also sets the charging/discharging circuit 3c to the charging mode for the minimum quantity of electric power Cmin, and switches the power supply circuit 3e from a standby state to a functioning state. By doing this, the storage battery 3d is charged as far as the limit set by the minimum quantity of electric power Cmin, and the majority of the AC quantity of power received from the ground power supply coil 2a is supplied to the power supply circuit 3e. As a result, the majority of the AC electric power received from the ground power supply coil 2a is supplied to the power supply coil 3f via the power supply circuit 3e, and is transmitted to the other unmanned transporting vehicle 3T.

If, however, the result of the determination in step S7 is [No] (namely, if the other unmanned transporting vehicle 3T is not close to being fully charged), the control device 3h starts receiving electric power from the ground power supply coil 2a, and not only charges the storage battery 3d in full charging mode using this received electric power, but also supplies the excess electric power to the other unmanned transporting vehicle 3T (step S10).

Namely, the control device 3h receives AC electric power from the ground power supply coil 2a via the power receiving coil 3a and the power receiving circuit 3b by switching the power receiving circuit 3b from a standby state to a functioning state. Moreover, the control device 3h sets the charging/discharging circuit 3c to full charging mode, and switches the power supply circuit 3e from standby mode to functioning mode. By doing this, the majority of the AC electric power received from the ground power supply coil 2a is used to charge the storage battery 3d, and the excess electric power from this charging is supplied to the power supply circuit 3e. As a result, the majority of the AC electric power received from the ground power supply coil 2a is used to charge the host unmanned transporting vehicle 3M, while the rest is supplied to the power supply coil 3f via the power supply circuit 3e, and is transmitted to the other unmanned transporting vehicle 3T.

Figure 5:
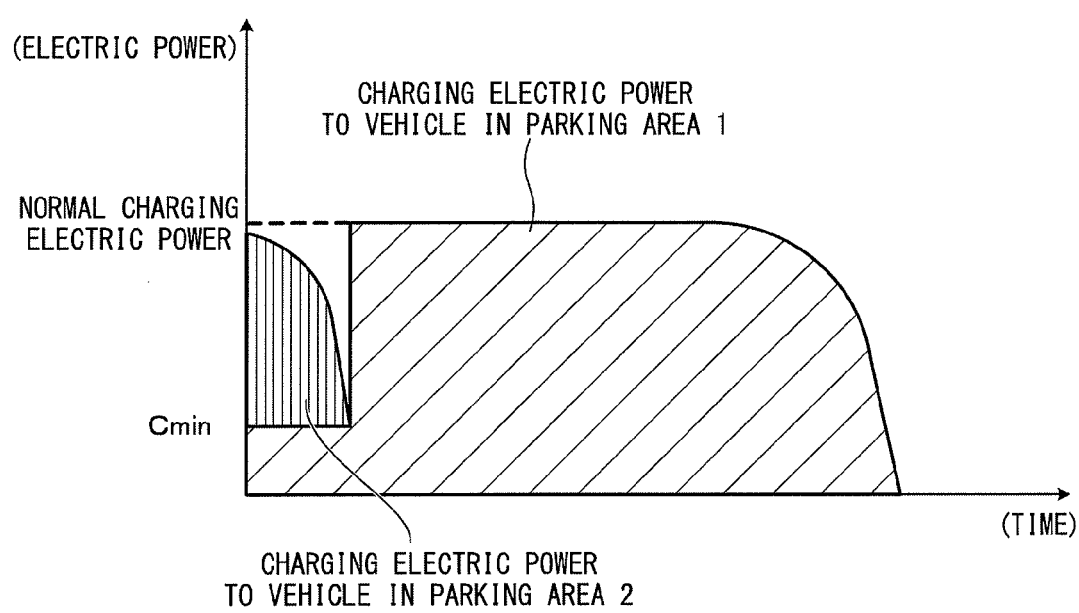
FIG. 5 is a characteristic view showing a charging pattern in the wireless power supply system according to the first embodiment of the present invention.

FIG. 5 is a characteristic view showing a charging pattern of the host unmanned transporting vehicle 3M (which is in the parking area 1) and the other unmanned transporting vehicle 3T (which is in the parking area 2) that is based on the above-described charging processing. If the other unmanned transporting vehicle 3T that has already parked in the parking area 2 is close to being fully charged, the host unmanned transporting vehicle 3M that is in the parking area 1 charges the storage battery 3d as far as the limit imposed by the minimum quantity of electric power Cmin, which is lower than the normal charging electric power quantity. Accordingly, the other unmanned transporting vehicle 3T is able to receive from the host unmanned transporting vehicle 3M a greater quantity of electric power than when the host unmanned transporting vehicle 3M is charging the storage battery 3d using normal charging electric power. As a result, the host unmanned transporting vehicle 3M is able to finish charging and return to transporting tasks sooner than when it is charging the storage battery 3d using normal charging electric power.

According to the present embodiment, the unmanned transporting vehicles 3 are provided not only with an electric power receiving function, but also with an electric power supplying function. Because of this, it is possible to supply electric power to another unmanned transporting vehicle 3 that has parked next to a particular unmanned transporting vehicle 3. Consequently, it is possible to reduce the number of ground power supply devices such as the ground power supply coil 2a compared to the number used conventionally. Accordingly, according to the present embodiment, it is possible to reduce the amounts of time and money that are needed to install and to also maintain ground power supply devices compared to the conventional system.

Moreover, according to the processing of the above-described steps S1 through S10, when an unmanned transporting vehicle 3 is parked in either one of the parking area 1 and the parking area 2 and is charging the storage battery 3d thereof, priority is given to the charging of the unmanned transporting vehicle 3 whose charging will be completed soonest. As a result, it is possible to increase the overall rate of productivity of the unmanned transporting vehicles 3.

[Second Embodiment]

Figure 6:
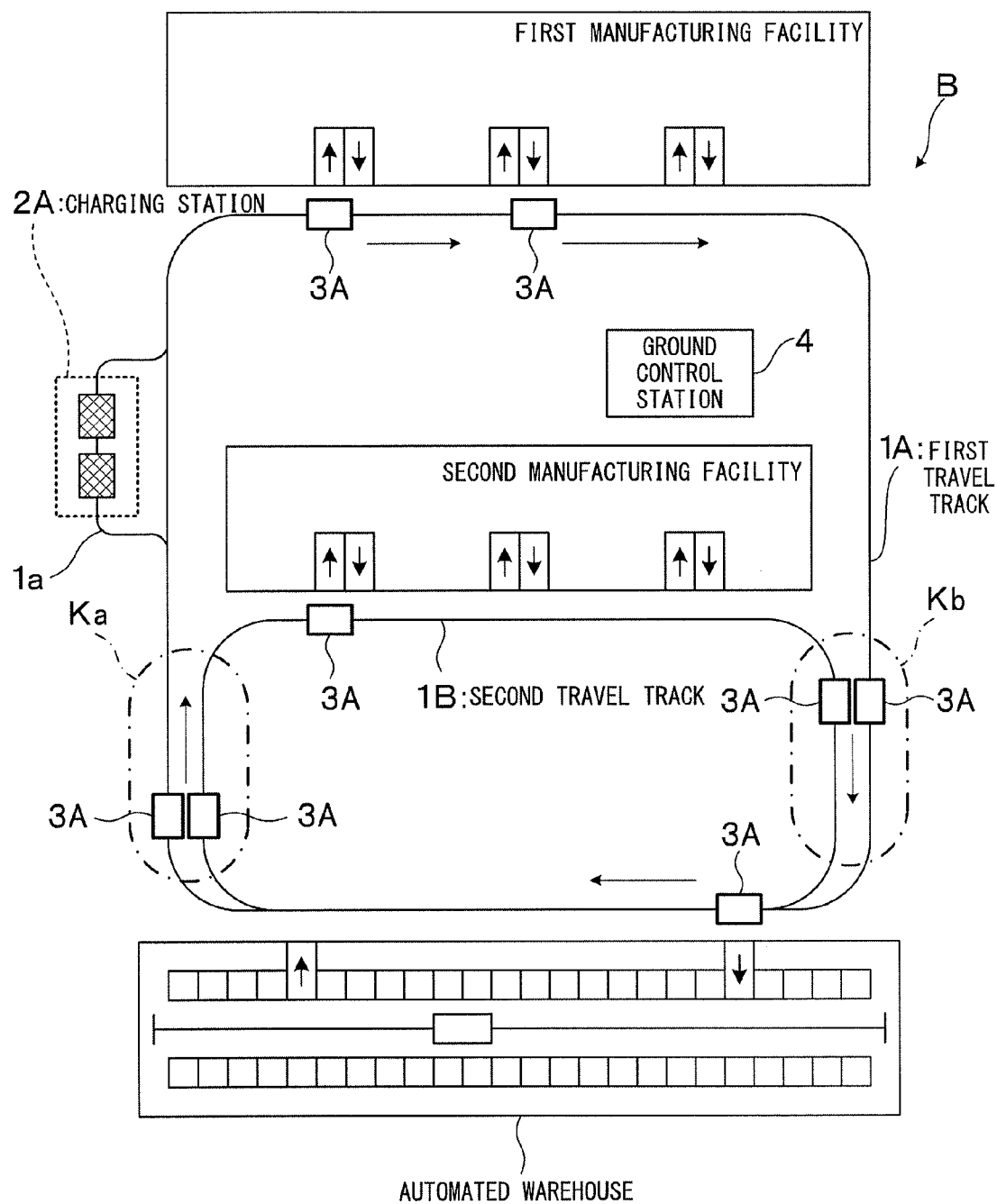
FIG. 6 is a system configuration diagram showing the overall structure of an unmanned transporting system according to the second embodiment of the present invention.

Next, a second embodiment of the present invention will be described. Note that the same symbols are used in the drawings of the second embodiment for structure that is the same as in the first embodiment. As is shown in FIG. 6, an unmanned transporting system B according to the present embodiment performs transporting tasks to transport articles such as components and finished products between an automated warehouse and a first manufacturing facility and also between the automated warehouse and a second manufacturing facility. The unmanned transporting system B is formed by a first travel track 1A, a second travel track 1B, a charging station 2A, a plurality of unmanned transporting vehicles 3 (i.e., vehicles), and a ground control station 4.

Storage stations and retrieval stations that are used for article transfers with the unmanned transporting vehicles 3A are provided in each of the aforementioned automated warehouse and first and second manufacturing facilities. As is shown in the drawing, the first travel track 1A is provided in a loop shape (i.e., an endless loop) that extends between the storage stations and retrieval stations of the automated warehouse and the storage stations and retrieval stations of the first manufacturing facility, and guides the traveling of the unmanned transporting vehicles 3A. The second travel track 1B is provided in a loop shape (i.e., an endless loop) that extends between the storage stations and retrieval stations of the automated warehouse and the storage stations and retrieval stations of the second manufacturing facility, and guides the traveling of the unmanned transporting vehicles 3A in the same way as the first travel track 1A.

First and second wireless power supply areas Ka and Kb that are parallel or almost parallel with each other are provided on the first and second travel tracks 1A and 1B such that a plurality of the unmanned transporting vehicles 3A are able to travel or park adjacent to each other. The first and second wireless power supply areas Ka and Kb are positions where the unmanned transporting vehicles 3A transfer electric power to each other (i.e., electric power transfer areas) (this is described below in detail). In the present embodiment, due to the configuration (i.e., the layout) of the first and second travel tracks 1A and 1B, the first wireless power supply area Ka and the second wireless power supply area Kb are provided in two mutually separate positions.

Figure 7:
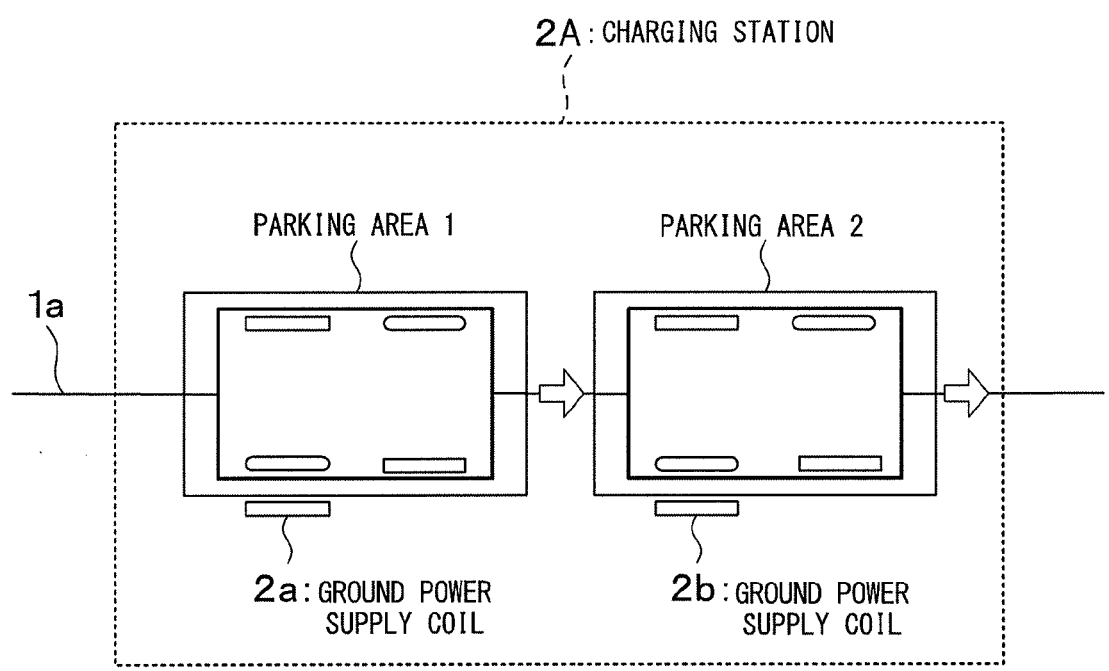
FIG. 7 is a view showing the detailed structure of a charging station in the second embodiment of the present invention.

The charging station 2A is, unlike the above-described first and second wireless power supply areas Ka and Kb, a position where the unmanned transporting vehicles 3A receive electric power from a fixed ground charging facility (i.e., an electric power supply position) without making physical contact. The charging station 2A is provided on a branch path 1a that branches off from a portion of the first travel track 1A. As is shown in FIG. 7, a parking area 1 and a parking area 2 that are in a front-rear positional relationship to each other on the branch path 1a are set in the charging station 2A. Moreover, the ground power supply coil 2a is provided adjacent to the parking area 1, while the ground power supply coil 2b is provided adjacent to the parking area 2.

The plurality of unmanned transporting vehicles 3A are battery-driven unmanned traveling vehicles that perform the task of transporting articles between the aforementioned automated warehouse and the first and second manufacturing facilities. Each unmanned transporting vehicle 3A travels in a clockwise direction shown by the arrows on the first and second travel tracks 1A and 1B based on command information relating to the transporting task that it has received via wireless communication from the ground control station 4. By doing this, each unmanned transporting vehicle 3A transports articles such as components and the like from the retrieval station of the automated warehouse to a storage station of the first and second manufacturing facilities, and transports articles such as finished products from a retrieval station of the first and second manufacturing facilities to the storage station of the automated warehouse.

Each unmanned transporting vehicle 3A performs transporting tasks while traveling on the first and second travel tracks 1A and 1B (this is described below in greater detail), performs wireless electric power transfer operations in the first and second wireless power supply areas Ka and Kb, and receives electric power in the charging station 2A.

Figure 8:
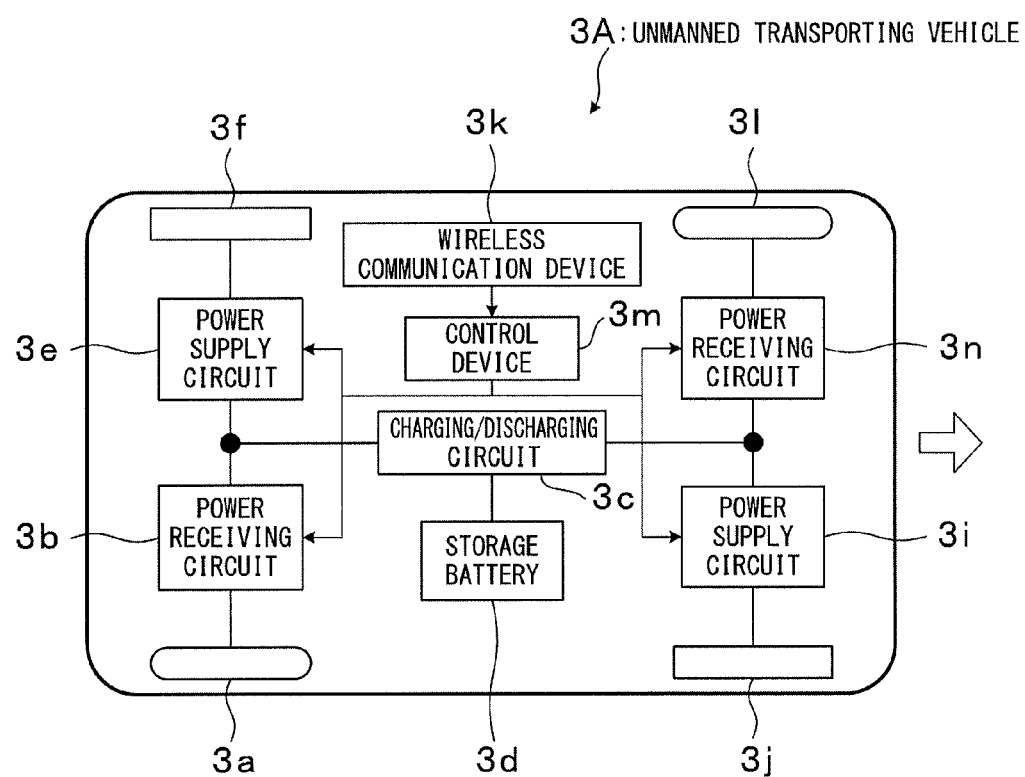
FIG. 8 is a block diagram showing the functional structure of an unmanned transporting vehicle (i.e., a vehicle) in the second embodiment of the present invention.

FIG. 8 shows the principal portions of each unmanned transporting vehicle 3A, namely, shows the functional structure of the power receiving and supply system. As is shown in FIG. 8, each unmanned transporting vehicle 3A is provided with two power receiving coils 3a and 3l, two power receiving circuits 3b and 3n, a charging/discharging circuit 3c, a storage battery 3d, two power supply circuits 3e and 3i, two power supply coils 3f and 3j, a wireless communication device 3k, and a control device 3m as functional component elements of the power receiving and supply system.

Figure 9:
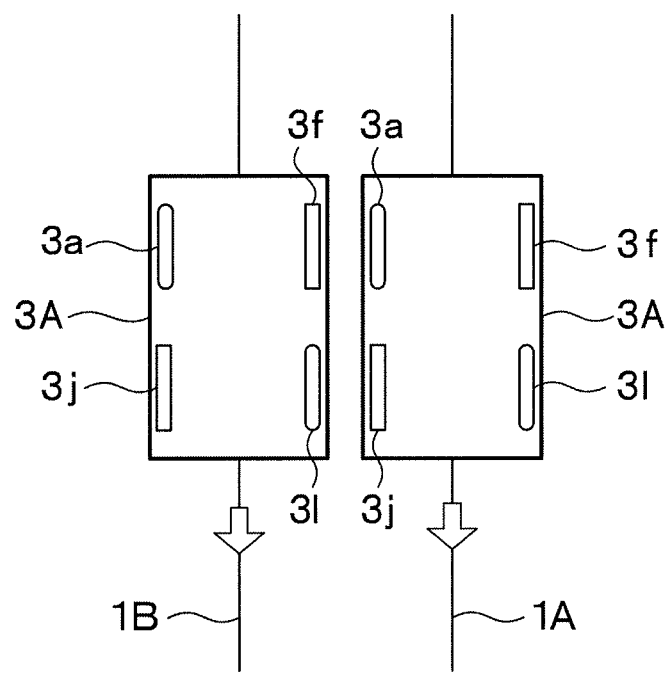
FIG. 9 is an outline view showing the state of a wireless power supply area in the second embodiment of the present invention.

As is shown in FIG. 8 and FIG. 9, the power receiving coil 3a is an induction coil that receives a wireless electric power supply from the above-described ground power supply coils 2a and 2b and from the power supply coil 3f of other unmanned transporting vehicles 3A. The power receiving coil 3a is provided at one side surface of the unmanned transporting vehicle 3A on the rearward side thereof and at a height (i.e., a position) where it faces directly towards the ground power supply coils 2a and 2b, and the power supply coil 3f of another unmanned transporting vehicle 3A. The power receiving coil 3a receives AC electric power by means of electromagnetic induction that is based on an alternating magnetic field that is generated by the ground power supply coils 2a and 2b and by the power supply coil 3f of the other unmanned transporting vehicle 3A without making any contact with these, and then outputs it to the power receiving circuit 3b. The power receiving circuit 3b is an electric power conversion circuit that converts the AC electric power input from the power receiving coil 3a into DC electric power, and outputs this DC electric power to the charging/discharging circuit 3c and the power supply circuit 3e.

The power receiving coil 3l is an induction coil that receives a wireless electric power supply from the power supply coil 3j of another unmanned transporting vehicle 3A, and is provided at the other side surface of the unmanned transporting vehicle 3A on the forward side thereof. The power receiving coil 3l receives AC electric power by means of electromagnetic induction that is based on an alternating magnetic field that is generated by the power supply coil 3j of the other unmanned transporting vehicle 3A without making any contact with this power supply coil 3j, and then outputs it to the power receiving circuit 3n. The power receiving circuit 3n is an electric power conversion circuit that converts the AC electric power input from the power receiving coil 3l into DC electric power, and outputs this DC electric power to the charging/discharging circuit 3c and the power supply circuit 3i.

The power supply circuit 3e is an electric power conversion circuit that converts the discharge electric power (i.e., DC electric power) supplied from the charging/discharging circuit 3c into AC electric power, and then outputs this AC electric power to the power supply coil 3f The power supply coil 3f generates an induction magnetic field based on the AC electric power supplied from the power supply circuit 3e, and supplies this AC electric power to the outside via the induction magnetic field. As is shown in the drawings, the power supply coil 3f is provided on the other side surface of the unmanned transporting vehicle 3A, which is on the opposite side from the power receiving coil 3a, and at the rear side thereof.

The power supply circuit 3i is an electric power conversion circuit that converts the discharge electric power (i.e., DC electric power) supplied from the charging/discharging circuit 3c into AC electric power, and then outputs this AC electric power to the power supply coil 3j. The power supply coil 3j generates an induction magnetic field based on the AC electric power supplied from the power supply circuit 3i, and supplies this AC electric power to the outside via the induction magnetic field. Moreover, the power supply coil 3j is provided on the other side surface of the unmanned transporting vehicle 3A, which is on the opposite side from the power receiving coil 3*l*, and at the rear side thereof.

The charging/discharging circuit 3*c* is an electric power regulating circuit that regulates the supply of electric power from the power receiving circuit 3*b* or the power receiving circuit 3*n* to the storage battery 3*d* (i.e., the charging), and the supply of electric power from the storage battery 3*d* to the power supply circuit 3*e* or the power supply circuit 3*i* (i.e., the discharging). The charging/discharging circuit 3*c*, for example, outputs the DC electric power supplied from the power receiving circuit 3*b* or the power receiving circuit 3*n* to the storage battery 3*d* as charging electric power while adjusting the current thereof such that this remains at a constant level. The charging/discharging circuit 3*c* also outputs the DC electric power (i.e., the discharge electric power) supplied from the storage battery 3*d* to the power supply circuit 3*e* or the power supply circuit 3*i* while regulating the upper limit value thereof. The storage battery 3*d* is a secondary battery such as a lithium-ion battery or a lead storage battery. The storage battery 3*d* is charged with the DC electric power supplied from the charging/discharging circuit 3*c*, and discharges its accumulated power (i.e., DC electric power) by supplying it to the charging/discharging circuit 3*c*.

Note that, although omitted from FIG. 8 and FIG. 9, the unmanned transporting vehicles 3A are provided with: the functional component elements of a driving system such as a plurality of drive wheels, carrying wheels, and a travel motor that drives the drive wheels; a load handling system that performs the receiving and delivery of articles with the storage stations and retrieval stations; and with the functional components of a main control system that collectively controls the driving system and the load handling system. The driving system, the load handling system, and the main control system function using electric power from the storage battery 3*d* as a power source.

The wireless communication device 3*k* exchanges information relating to transporting tasks and to electric power receiving and supply by communicating wirelessly with the ground control station 4, and with the wireless communication devices 3*k* of other unmanned transporting vehicles 3A. The control device 3*m* collectively controls the two power receiving circuits 3*b* and 3*n*, the charging/discharging circuit 3*c*, the two power supply circuits 3*e* and 3*i*, and the wireless communication device 3*k* based on predetermined control programs. By performing this control, the control device 3*m* is able to perform the transporting tasks and the exchanging of electric power with other unmanned transporting vehicles 3A.

The ground control station 4 is a control device that collectively controls this unmanned transporting system B. The ground control station 4 controls operations of the unmanned transporting vehicles 3A by communicating wirelessly with the wireless communication devices 3*k* of the above-described unmanned transporting vehicles 3A, and controls the supply of electric power to the ground power supply coils 2*a* and 2*b* of the charging station 2A.

Figure 10:
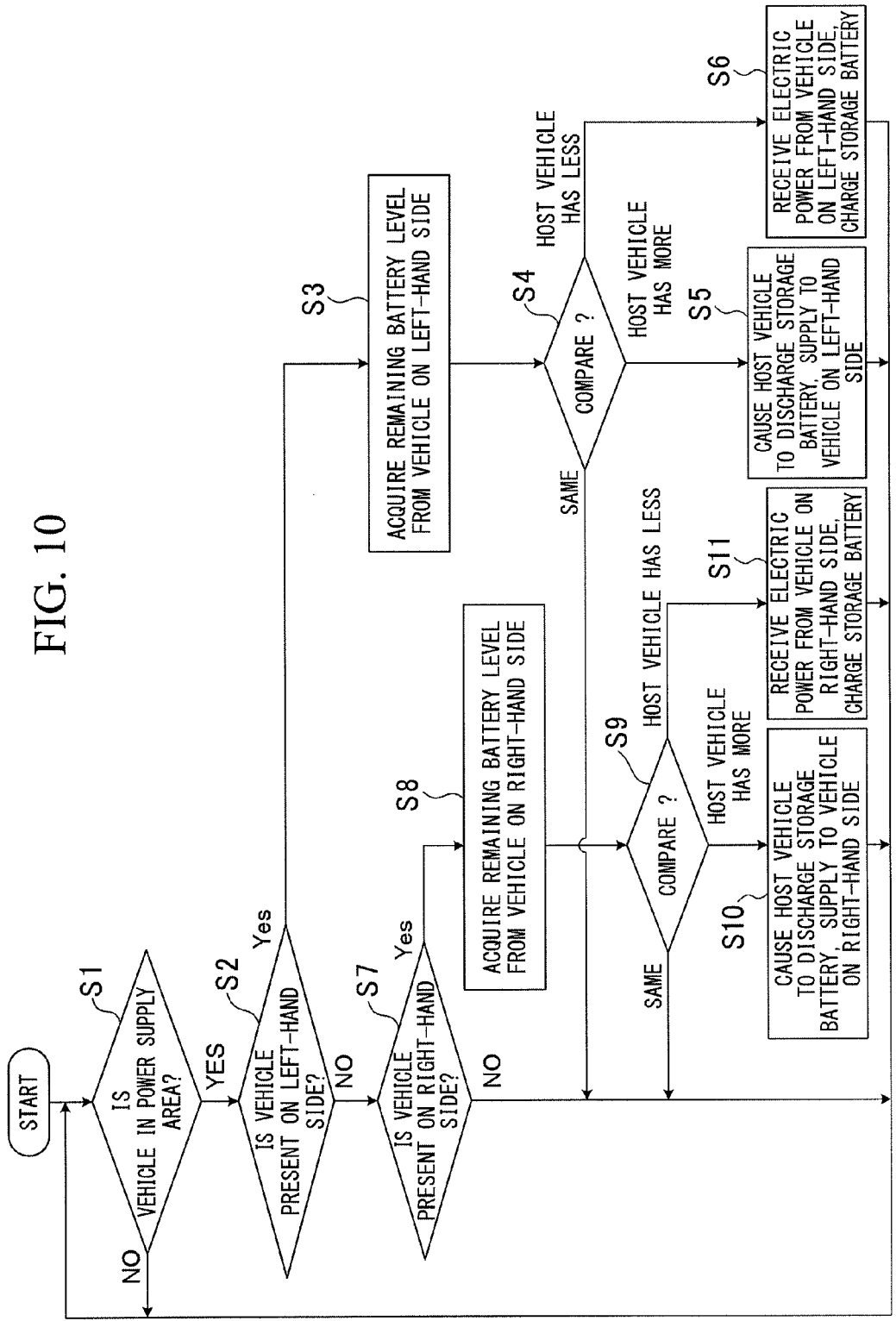
FIG. 10 is a flowchart showing a characteristic operation of an unmanned transporting system according to the second embodiment of the present invention.

Next, operations of the unmanned transporting system B and, in particular, electric power transfer operations of the unmanned transporting vehicles 3A will be described in detail with reference made to FIG. 10. Note that in the following description, right-hand side and left-hand side refer to the right side and left side relative to the forward direction of travel of the unmanned transporting vehicles.

In this unmanned transporting system B, the ground control station 4 collectively controls the transporting tasks of the unmanned transporting vehicles 3A. Namely, each unmanned transporting vehicle 3A travels in a clockwise direction shown by the arrows on the first and second travel tracks 1A and 1B based on command information relating to the transporting task that it has received via the wireless communication device 3*k*. By doing this, each unmanned transporting vehicle 3A transports articles that it has received from the retrieval station of the automated warehouse to a storage station of the first manufacturing facility or second manufacturing facility, and transports articles that it has received from a retrieval station of the first manufacturing facility or second manufacturing facility to the storage station of the automated warehouse.

As a result of receiving in sequence command information relating to transporting tasks from the ground control station 4, the unmanned transporting vehicle 3A repeats in sequence the above-described transporting tasks. When an unmanned transporting vehicle 3A travels over the first or second travel tracks 1A or 1B, the control device 3*m* thereof executes the electric power transfer processing shown in FIG. 10 at regular time intervals. Namely, when an unmanned transporting vehicle 3A travels over the first or second travel tracks 1A or 1B, the control device 3*m* thereof determines whether or not it is in one of the first wireless power supply area Ka and the second wireless power supply area Kb, which are electric power transfer areas, based, for example, on the distance traveled from the respective storage stations and entry stations (step S1).

If the result of the determination in step S1 is [Yes] (namely, if the control device 3*m* of the unmanned transporting vehicle 3A is present in either the first wireless power supply area Ka or the second wireless power supply area Kb, the control device 3*m* of the unmanned transporting vehicle 3A determines whether or not another unmanned transporting vehicle 3A is currently traveling in parallel with it on the first travel track 1A which is on the left-hand side thereof (step S2). Namely, if the control device 3*m* is currently located in the first wireless power supply area Ka, then that control device 3*m* performs wireless communication using the wireless communication device 3*k* with the ground control station 4 or with another unmanned transporting vehicle 3A that has traveled along the first travel track 1A so as to enter into the first wireless power supply area Ka, and then performs the determination processing of step S2. If that control device 3*m* is currently located in the second wireless power supply area Kb, then that control device 3*m* performs wireless communication using the wireless communication device 3*k* with the ground control station 4 or with another unmanned transporting vehicle 3A that has traveled along the first travel track 1A so as to enter into the second wireless power supply area Kb, and then performs the determination processing of step S2. Note that if the result of the determination in step S1 is [No] (namely, if the control device 3*m* is currently located in neither the first wireless power supply area Ka nor the second wireless power supply area Kb), then the control device 3*m* repeats the determination processing of step S1.

If the result of the determination in step S2 is [Yes] (namely, if, as is shown in FIG. 9, the host unmanned transporting vehicle 3A of the control device 3*m* is the unmanned transporting vehicle 3A that is traveling on the second travel track 1B, and another unmanned transporting vehicle 3A is also currently traveling on the first travel track 1A on the left-hand side of the host unmanned transporting vehicle 3A), then the control device 3*m* of the host unmanned transporting vehicle 3A performs wireless communication with that other unmanned transporting vehicle 3A that is currently located on its left-hand side. By doing this, it acquires information about the amount of electric power (i.e., the other remaining battery level) remaining in the other unmanned transporting vehicle 3A (step S3).

The control device 3m then compares this other remaining battery level with the remaining battery level (i.e., the host remaining battery level) of the storage battery 3d that it has acquired from the charging/discharging circuit 3c (step S4). If the host remaining battery level is higher than the other remaining battery level, then the control device 3m sets the charging/discharging circuit 3c to discharging mode, and supplies the stored electric power in the storage battery 3d to the power supply circuit 3e. By doing this, electric power is supplied to the other unmanned transporting vehicle 3A via the power supply coil 3f (step S5).

If, however, the control device 3m of the unmanned transporting vehicle 3A determines in step S4 that the host remaining battery level is lower than the other remaining battery level, it sets the charging/discharging circuit 3c to charging mode and causes the power receiving circuit 3n to start functioning. By doing this, electric power is received via the power receiving coil 3l from the other unmanned transporting vehicle 3A that is adjacent thereto on the left-hand side, and this is used to charge the power storage battery 3d (step S6). Note that if it is determined in step S4 that the host remaining battery level is the same as the other remaining battery level, the control device 3m repeats the processing of step S1 without performing the electric power supply processing of step S5 or the charging processing of step S6.

If the result of the determination in step S2 is [No], then if the control device 3m of the unmanned transporting vehicle 3A is positioned within the first wireless power supply area Ka, the control device 3m of the unmanned transporting vehicle 3A determines whether or not another unmanned transporting vehicle 3A is currently traveling in parallel with it on the second travel track 1B, which is on the right-hand side thereof, by performing wireless communication using the wireless communication device 3k with the ground control station 4 or with another unmanned transporting vehicle 3A that has traveled along the second travel track 1B so as to enter into the first wireless power supply area Ka. However, if the control device 3m of the unmanned transporting vehicle 3A is positioned within the second wireless power supply area Kb, the control device 3m of the unmanned transporting vehicle 3A determines whether or not another unmanned transporting vehicle 3A is currently traveling in parallel with it on the second travel track 1B, which is on the right-hand side thereof, by performing wireless communication using the wireless communication device 3k with the ground control station 4 or with another unmanned transporting vehicle 3A that has traveled along the second travel track 1B so as to enter into the second wireless power supply area Kb (step S7).

Namely, if the result of the determination in step S7 is [Yes] (namely, if, as is shown in FIG. 9, the host unmanned transporting vehicle 3A of the control device 3m is the unmanned transporting vehicle 3A that is traveling on the first travel track 1A, and another unmanned transporting vehicle 3A is also currently traveling on the second travel track 1B on the right-hand side of the host unmanned transporting vehicle 3A), then the control device 3m of the host unmanned transporting vehicle 3A performs wireless communication with that other unmanned transporting vehicle 3A that is currently located on its right-hand side. By doing this, it acquires information about the amount of electric power (i.e., the other remaining battery level) remaining in the other unmanned transporting vehicle 3A (step S8).

The control device 3m then compares this other remaining battery level with the remaining battery level (i.e., the host remaining battery level) of the storage battery 3d that it has acquired from the charging/discharging circuit 3c (step S9). If the host remaining battery level is higher than the other remaining battery level, then the control device 3m sets the charging/discharging circuit 3c to discharging mode, and supplies the stored electric power in the storage battery 3d to the power supply circuit 3i. By doing this, electric power is supplied to the other unmanned transporting vehicle 3A via the power supply coil 3j (step S10).

If, however, the control device 3m of the unmanned transporting vehicle 3A determines in step S9 that the host remaining battery level is lower than the other remaining battery level, it sets the charging/discharging circuit 3c to charging mode and causes the power receiving circuit 3b to start functioning. By doing this, electric power is received via the power receiving coil 3a from the other unmanned transporting vehicle 3A that is adjacent thereto on the right-hand side, and this is used to charge the power storage battery 3d (step S11). Note that if it is determined in step S9 that the host remaining battery level is the same as the other remaining battery level, the control device 3m repeats the processing of step S1 without performing the electric power supply processing of step S10 or the charging processing of step S11.

According to the electric power transfer processing performed by the unmanned transporting vehicles 3A, the first and second wireless power supply areas Ka and Kb are provided partway along the first and second travel parts 1A and 1B. Moreover, the unmanned transporting vehicles 3A are also provided with an electric power supply function in addition to an electric power receiving function. Because of this, during a normal transporting task, electric power can be transferred from an unmanned transporting vehicle 3A having a higher remaining battery level to an unmanned transporting vehicle 3A having a lower remaining battery level. Accordingly, according to the present embodiment, it is possible to considerably reduce the number of times that an unmanned transporting vehicle 3A must interrupt the transporting task in order to travel to a charging station 2A and charge its batteries compared to the conventional system. As a consequence, compared to the conventional system it is possible to reduce the adverse effects on the transporting tasks performed by an unmanned transporting vehicle 3A that are inflicted thereon by the task of charging that unmanned transporting vehicle 3A. Furthermore, increase in the size of the storage battery 3d of an unmanned transporting vehicle 3A can be avoided.

Note that the present invention is not limited to the above-described first and second embodiments and, for example, the following variant examples may also be considered.

(1) In the first and second embodiments, a power transmission system in which each of the unmanned transporting vehicles 3 and 3A transfer electric power wirelessly without making any physical contact with each other is described, however, the present invention is not limited to this. The present invention can also be applied to a power transmission system in which the unmanned transporting vehicles 3 and 3A do make contact with each other using electric power supply brushes or the like.

(2) In the first and second embodiments, a case in which a wireless power supply system is used in the unmanned transporting systems A and B is described, however, the present invention is not limited to this. The present invention can also be used in a variety of applications in addition to the unmanned transporting systems A and B. Namely, the vehicles of the present invention are not limited to the unmanned transporting vehicles 3 and 3A, and the present invention can also be applied to a variety of vehicles that require charging, for example, to vehicles that are driven by a human driver.

(3) In the first embodiment, the power receiving coil 3a and the power supply coil 3f are provided respectively on mutually different side surfaces of each unmanned transporting vehicle 3, however, the present invention is not limited to this. It is also possible for the power receiving coil 3a and the power supply coil 3f to be provided respectively on the front and rear of each unmanned transporting vehicle 3. In this case, the wireless power supply system is provided with a charging station in which the parking area 1 and the parking area 2 are provided at the front and rear on the branch path 1a. Moreover, in the above-described embodiments, two parking areas are provided adjacent to each other, however, the number of parking areas may also be three or more.

(4) In the first embodiment, charging information and the like about another unmanned transporting vehicle 3 is acquired using the wireless communication device 3g of each unmanned transporting vehicle 3, however, the present invention is not limited to this. It is also possible for charging information and the like about another unmanned transporting vehicle 3 to be acquired using means other than the wireless communication device 3g. For example, it is also possible for the power receiving coil 3a and the power supply coil 3f to be used not only for electric power transmission, but for charging information and the like about the unmanned transporting vehicles 3 to be acquired by also using these for the wireless transmission of signals.

(5) In the electric power supply processing or charging (i.e., electric power receiving) processing of the respective steps S5, S6, S10, and S11 of the second embodiment, electric power supply processing or charging (i.e., electric power receiving) processing is performed while the unmanned transporting vehicle 3A that is traveling on the first travel track 1A and the unmanned transporting vehicle 3A that is traveling on the second travel track 1B are both traveling, however, the present invention is not limited to this. It is also possible, for example, to detect when each unmanned transporting vehicle 3A enters one of the first and second wireless power supply areas Ka and Kb, and if another unmanned transporting vehicle 3A is detected as being on the left-hand side or the right-hand side thereof at that time, then these unmanned transporting vehicles may both be temporarily stopped or slowed down, and the electric power supply processing or charging (i.e., electric power receiving) processing then performed.

(6) In the second embodiment, in order to obtain a stable electric power supply or charging (i.e., electric power receiving) in the first and second wireless power supply areas Ka and Kb, it is essential for two unmanned transporting vehicles 3A to maintain the same distance from each other. Namely, it is essential for the distance between the power receiving coil 3a of one unmanned transporting vehicle 3A and the power supply coil 3f of the other unmanned transporting vehicle 3A, and the distance between the power receiving coil 3l of the other unmanned transporting vehicle 3A and the power supply coil 3j of the one unmanned transporting vehicle 3A to be kept at a constant distance from each other. If the above-described stable electric power supply or charging (i.e., electric power receiving) is considered, then because it is preferable for the traveling speed of the two unmanned transporting vehicles 3A to be equal in the first and second wireless power supply areas Ka and Kb, it is preferable for their speeds to be adjusted, for example, by wireless communication between the two unmanned transporting vehicles 3A such that that the traveling speed of the two unmanned transporting vehicles 3A is equal.

(7) In the second embodiment, electric power supply processing or charging (i.e., electric power receiving) processing is performed between two travel tracks (namely, between the unmanned transporting vehicles 3A traveling along the first and second travel tracks 1A and 1B), however, the number and layout of the travel tracks is not limited to this. For example, if there are three travel tracks 1 to 3, then a wireless power supply area is set between the mutually adjacent travel track 1 and travel track 2, and a wireless power supply area is set between the mutually adjacent travel track 2 and travel track 3. By doing this, it is possible to perform electric power supply processing or charging (i.e., electric power receiving) processing between all of the three travel tracks 1 to 3.

INDUSTRIAL APPLICABILITY

According to the present invention, a vehicle is able to supply electric power to another vehicle that has parked adjacently to that vehicle. Accordingly, it is possible to decrease the number of ground power supply devices compared to a conventional system. As a result, the time and expenditure required for the installation of the ground power supply as well as for their maintenance can both be reduced compared to a conventional system.

Furthermore, a vehicle is able to receive electric power without traveling past a charging station. Accordingly, compared to the conventional system, it is possible to reduce the effects inflicted on a transporting task by the task of charging a vehicle. Furthermore, it is also possible to suppress any tendency for the size of the battery to increase.

DESCRIPTION OF THE REFERENCE NUMERALS

1 . . . Travel track, 1A . . . First travel track, 1B . . . Second travel track, 1a . . . Branch path, 2, 2A . . . Charging station, 2a, 2b . . . Ground power supply coil, 3, 3A . . . Unmanned transporting vehicle (Vehicle), 3a, 3l . . . Power receiving coil, 3b, 3n . . . Power receiving circuit, 3c . . . Charging/discharging circuit, 3d . . . Storage battery, 3e, 3i . . . Power supply circuit, 3f, 3j . . . Power supply coil, 3g, 3k . . . Wireless communication device, 3h, 3m . . . Control device, 4 . . . Ground control station, Ka . . . First wireless power supply area, Kb . . . Second wireless power supply area

The invention claimed is:

1. A wireless power supply system that supplies electric power from a ground power supply device to a vehicle without making contact with that vehicle, comprising:
the vehicle comprising a power receiving device that is provided so as to face the ground power supply device and that receives electric power from the ground power supply device, a power storage device that stores the electric power received by the power receiving device, and a power supply device that supplies at least a portion of the electric power received by the power receiving device to another vehicle; and a plurality of parking areas that are mutually adjacent to each other where the vehicle and the another vehicle park mutually adjacent to each other.

2. The wireless power supply system according to claim 1, wherein the parking areas are provided on travel tracks along which moving objects in a form of unmanned transporting vehicles travel.

3. The wireless power supply system according to claim 1, wherein the ground power supply system is provided at only a portion of the plurality of parking areas.

4. A transporting system comprising:

a plurality of vehicles that are driven by a power storage device and that receive electric power from outside by a power receiving device and supply electric power to outside by a power supply device;

a plurality of travel tracks along which the vehicles travel; and power transfer areas that are areas where a particular travel track is adjacent to another travel track, and where a vehicle traveling along a particular travel track and a vehicle traveling along another travel track are able to mutually transfer electric power to each other, wherein the vehicles mutually transfer electric power while traveling in a power transfer area.

5. The transporting system according to claim 4, wherein power receiving coils that receive electric power without making contact and power supply coils that receive electric power without making contact are provided in a plurality of positions in the vehicles.

6. The transporting system according to claim 4, wherein a ground power supply system that wirelessly supplies electric power to the vehicles is provided at either one of the particular travel track and the another travel track.

7. The transporting system according to claim 4, wherein if there is the vehicle traveling along the another travel track adjacent to a particular travel track, the vehicle traveling along the particular travel track acquires information about the amount of electric power remaining in the vehicle traveling along the another travel track; and if a host remaining battery level is higher than the other remaining battery level, the vehicle traveling along a particular travel track supplies electric power to the vehicle traveling along the another travel track.

8. The transporting system according to claim 7, wherein the information about the amount of electric power is the other remaining battery level.

9. The transporting system according to claim 4, wherein if there is the vehicle traveling along the another travel track adjacent to a particular travel track, the vehicle traveling along the particular travel track acquires information about the amount of electric power remaining in the vehicle traveling along the another travel track; and if a host remaining battery level is lower than the other remaining battery level, the vehicle traveling along a particular travel track receives electric power from the vehicle traveling along the another travel track.

10. The transporting system according to claim 9, wherein the information about the amount of electric power is the other remaining battery level.

* * * * *